US008868431B2

(12) United States Patent
Yamazaki et al.

(10) Patent No.: US 8,868,431 B2
(45) Date of Patent: Oct. 21, 2014

(54) RECOGNITION DICTIONARY CREATION DEVICE AND VOICE RECOGNITION DEVICE

(75) Inventors: Michihiro Yamazaki, Tokyo (JP); Jun Ishii, Tokyo (JP); Yasushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 339 days.

(21) Appl. No.: 13/505,243

(22) PCT Filed: Feb. 5, 2010

(86) PCT No.: PCT/JP2010/000709
§ 371 (c)(1),
(2), (4) Date: Apr. 30, 2012

(87) PCT Pub. No.: WO2011/096015
PCT Pub. Date: Aug. 11, 2011

(65) Prior Publication Data
US 2012/0226491 A1  Sep. 6, 2012

(51) Int. Cl.
| | |
|---|---|
| *G10L 21/00* | (2013.01) |
| *G06F 17/28* | (2006.01) |
| *G06F 17/27* | (2006.01) |
| *G10L 15/26* | (2006.01) |
| *G10L 17/00* | (2013.01) |
| *G10L 15/04* | (2013.01) |
| *G10L 15/14* | (2006.01) |
| *G10L 13/00* | (2006.01) |
| *G10L 13/08* | (2013.01) |
| *G10L 13/06* | (2013.01) |
| *G10L 11/00* | (2006.01) |
| *G10L 15/06* | (2013.01) |

(52) U.S. Cl.
CPC ..................................... *G10L 15/06* (2013.01)
USPC ................... 704/277; 704/4; 704/9; 704/235; 704/246; 704/249; 704/251; 704/257; 704/254; 704/258; 704/260; 704/261; 704/267; 704/268; 704/266; 704/270; 704/270.1; 704/275

(58) Field of Classification Search
USPC ........... 704/8, 9, 10, 235, 246, 249, 251, 257, 704/254, 258, 260, 261, 267, 268, 266, 278, 704/270, 270.1, 275, 277
See application file for complete search history.

(56) References Cited

U.S. PATENT DOCUMENTS 5,913,185 A * 6/1999 Martino et al. .................... 704/8
6,167,369 A * 12/2000 Schulze ............................. 704/9

(Continued)

FOREIGN PATENT DOCUMENTS

| DE | 112009003930 T5 | 9/2012 |
|---|---|---|
| EP | 1217610 A1 | 6/2002 |

(Continued)

OTHER PUBLICATIONS

Badino et al., ("Approach to TTS Reading of Mixed-Language Texts", Proc. of 5th ISCA Tutorial and Research Workshop on Speech Synthesis, Pittsburg, PA, 2004).*

(Continued)

*Primary Examiner* — Edgar Guerra-Erazo
(74) *Attorney, Agent, or Firm* — Birch, Stewart, Kolasch & Birch, LLP

(57) ABSTRACT

A recognition dictionary creation device identifies the language of a reading of an inputted text which is a target to be registered and adds a reading with phonemes in the language identified thereby to the target text to be registered, and also converts the reading of the target text to be registered from the phonemes in the language identified thereby to phonemes in a language to be recognized which is handled in voice recognition to create a recognition dictionary in which the converted reading of the target text to be registered is registered.

12 Claims, 6 Drawing Sheets

(56) References Cited

U.S. PATENT DOCUMENTS

| | | | |
|---|---|---|---|
| 6,219,646 B1* | 4/2001 | Cherny | 704/277 |
| 6,275,789 B1* | 8/2001 | Moser et al. | 704/7 |
| 6,442,524 B1* | 8/2002 | Ecker et al. | 704/277 |
| 7,035,801 B2* | 4/2006 | Jimenez-Feltstrom | 704/255 |
| 8,200,478 B2 | 6/2012 | Ebihara et al. | |
| 8,326,602 B2* | 12/2012 | Sites | 704/8 |
| 2004/0015356 A1* | 1/2004 | Nakamura et al. | 704/250 |
| 2004/0039570 A1 | 2/2004 | Harengel et al. | |
| 2004/0078191 A1 | 4/2004 | Tian et al. | |
| 2005/0267755 A1 | 12/2005 | Suontausta | |
| 2006/0106604 A1 | 5/2006 | Okimoto | |
| 2006/0229864 A1 | 10/2006 | Suontausta et al. | |
| 2008/0255841 A1 | 10/2008 | Hanazawa et al. | |
| 2010/0082329 A1* | 4/2010 | Silverman et al. | 704/8 |
| 2010/0125447 A1* | 5/2010 | Goswami | 704/8 |
| 2012/0239399 A1* | 9/2012 | Yamazaki et al. | 704/243 |
| 2013/0080146 A1* | 3/2013 | Kato et al. | 704/2 |

FOREIGN PATENT DOCUMENTS

| | | |
|---|---|---|
| JP | 2004-53979 A | 2/2004 |
| JP | 2004-271895 A | 9/2004 |
| JP | 2005-241952 A | 9/2005 |
| JP | 2009-37633 A | 2/2006 |
| JP | 2006-59105 A | 3/2006 |
| JP | 2006-106775 A | 4/2006 |
| JP | 3776391 B2 | 5/2006 |
| JP | 2008-262279 A | 10/2008 |
| JP | 2009-169113 A | 7/2009 |
| JP | 2009-300573 A | 12/2009 |
| WO | WO 03/060877 A1 | 7/2003 |

OTHER PUBLICATIONS

Shannon, "A Mathematical Theory of Communication", The Bell Sytem Technical Journal, vol. 27, pp. 379-423 and 623-656, Jul., Oct., 1948.

* cited by examiner

FIG.3

| German | English |
|--------|---------|
| /a/    | /{/     |
| /E/    | /E/     |
| /I/    | /I/     |
| /O/    | /O/     |
| /Y/    | /}/     |
| /E:/   | /E@/    |
| ⋮      | ⋮       |
| /Z/    | /Z/     |
| /x/    | /h/     |
| /h/    | /h/     |
| /m/    | /m/     |
| ⋮      | ⋮       |

RECOGNITION DICTIONARY CREATION DEVICE AND VOICE RECOGNITION DEVICE

FIELD OF THE INVENTION

The present invention relates to a recognition dictionary creation device which creates a dictionary including words each of which is a target for voice recognition, and a voice recognition device using this recognition dictionary creation device.

BACKGROUND OF THE INVENTION

Patent reference 1 discloses a voice recognition device which can perform voice recognition supporting many languages by simultaneously using acoustic models for a plurality of languages each of which is a target for voice recognition.

A problem with the invention disclosed by this patent reference 1 is, however, that it is necessary to provide an acoustic model for many languages which supports all of the plurality of languages each of which is a target for voice recognition, and hence the conventional invention cannot be applied to typical voice recognition which supports only one language.

Further, the voice recognition device in accordance with the invention disclosed by this patent reference 1 needs to specify in which language a word to be recognized is described in advance, and add a reading to the word to be recognized.

On the other hand, in voice recognition which supports only one language, a reading in a language to be recognized is automatically created for a target text to be registered to which no reading is added, and voice recognition is then performed on the reading. At this time, no reading can be added to a text described in any language other than the language to be recognized.

The present invention is made in order to solve the above-mentioned problems, and it is therefore an object of the present invention to provide a recognition dictionary creation device which, even if the language in which a word which is a target to be registered in a recognition dictionary is described is unknown, can convert the reading of the word into a reading in the phonemic system of a language for voice recognition to create a recognition dictionary, and a voice recognition device using this recognition dictionary creation device.

RELATED ART DOCUMENT

Patent Reference

Patent reference 1: Japanese Patent No. 3776391

SUMMARY OF THE INVENTION

In accordance with the present invention, there is provided a recognition dictionary creation device including: a language identification unit for identifying a language of a reading of an inputted text which is a target to be registered; a reading addition unit for adding a reading with phonemes in the language identified by the language identification unit to the target text to be registered; a reading conversion unit for converting the reading of the target text to be registered from the phonemes in the language identified by the language identification unit to phonemes in a language to be recognized which is handled in voice recognition; and a recognition dictionary creation unit for creating a recognition dictionary in which the reading of the target text to be registered which is converted by the reading conversion unit is registered.

The recognition dictionary creation device in accordance with the present invention identifies the language of the reading of the inputted text which is a target to be registered and adds a reading with phonemes in the language identified thereby to the target text to be registered, and also converts the reading of the target text to be registered from the phonemes in the language identified thereby to phonemes in the language to be recognized which is handled in voice recognition to create a recognition dictionary in which the converted reading of the target text to be registered is registered. By doing in this way, even when in which language the target text (word) to be registered is described is unknown, the recognition dictionary creation device can provide an advantage of being able to acquire a recognition dictionary which is adapted to the phonemic system of the language used in voice recognition.

BRIEF DESCRIPTION OF THE FIGURES

FIG. 3 is a view showing an example of a correspondence list and shows a correspondence between phonemes in German and those in English which are similar to each other in pronunciation;

EMBODIMENTS OF THE INVENTION

Hereafter, in order to explain this invention in greater detail, the preferred embodiments of the present invention will be described with reference to the accompanying drawings.

Embodiment 1

Figure 1:
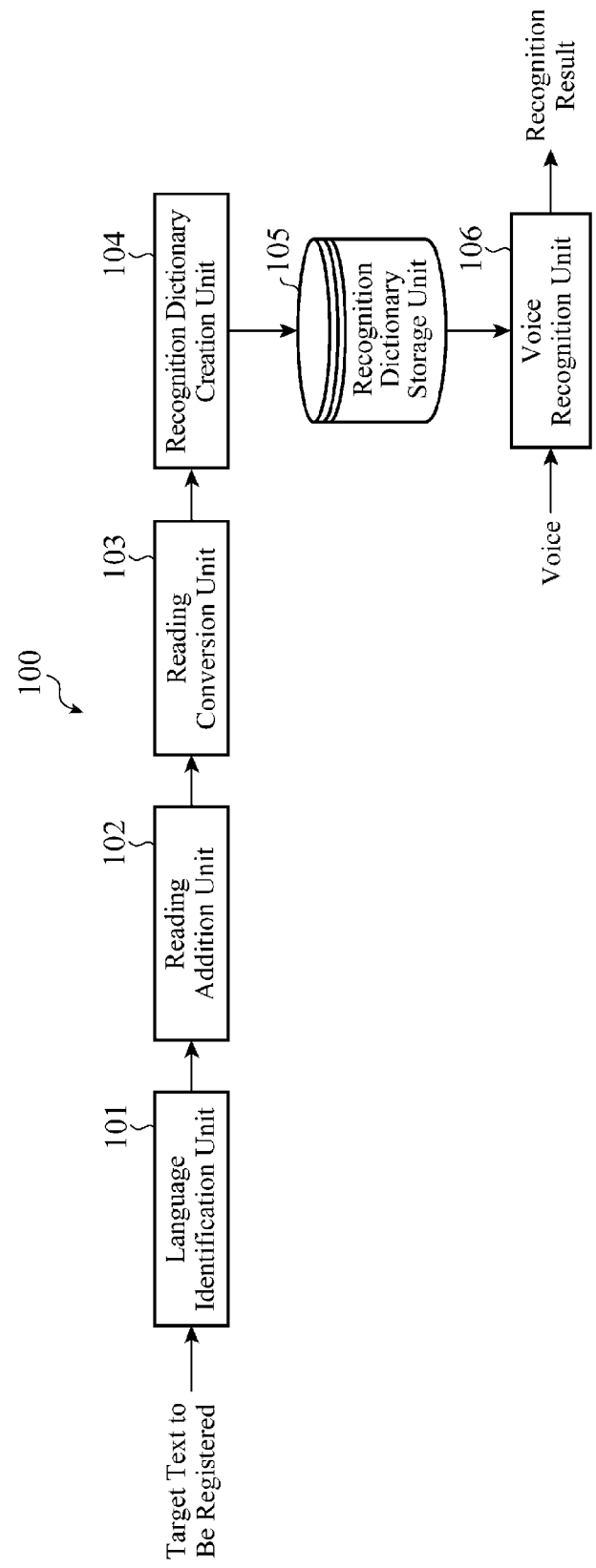
FIG. 1 is a block diagram showing the structure of a registration type voice recognition device which uses a recognition dictionary creation device in accordance with Embodiment 1 of the present invention.

FIG. 1 is a block diagram showing the structure of a registration type voice recognition device which uses a recognition dictionary creation device in accordance with Embodiment 1 of the present invention. Referring to FIG. 1, the voice recognition device 100 in accordance with Embodiment 1 is provided with a language identification unit 101, a reading addition unit 102, a reading conversion unit 103, a recognition dictionary creation unit 104, a recognition dictionary storage unit 105, and a voice recognition unit 106. Among these components, the language identification unit 101, the reading addition unit 102, the reading conversion unit 103, the recognition dictionary creation unit 104, and the recognition dictionary storage unit 105 are structural components of the recognition dictionary creation device in accordance with Embodiment 1.

The language identification unit 101 is a component for identifying the language in which a text string (referred to as a target text to be registered from here on) of a word which is a target to be registered in a recognition dictionary is described. A text string of a word the language of which cannot be specified easily can be the target text to be registered. For example, bibliographic data, such as the title or the artist name of a musical piece registered in a portable music player, or the name of a place, the name of a person or the like which is registered in a mobile phone can be provided as the target text to be registered. The reading addition unit 102 is a component for adding a reading with phonemes in the language identified by the language identification unit 101 to the target text to be registered. The reading conversion unit 103 is a component for converting the reading which is added to the target text to be registered by the reading addition unit 102 into that with phonemes in a language which is used in voice recognition which is performed by the voice recognition unit 106.

The recognition dictionary creation unit 104 is a component for creating a word which is a target for voice recognition (referred to as a word to be recognized from here on) from the phonemes into which the original phonemes are converted by the reading conversion unit 103, and then registering this word in the recognition dictionary of the recognition dictionary storage unit 105. The recognition dictionary storage unit 105 is a storage unit in which data can be written by the recognition dictionary creation unit 104 and by the voice recognition unit 106, for storing the recognition dictionary in which the word to be recognized created by the recognition dictionary creation unit 104 is registered. The voice recognition unit 106 is a component for carrying out voice recognition by using the word to be recognized in the recognition dictionary stored in the recognition dictionary storage unit 105, and outputting the result of the recognition.

Further, the language identification unit 101, the reading addition unit 102, the reading conversion unit 103, the recognition dictionary creation unit 104, the recognition dictionary storage unit 105, and the voice recognition unit 106 can be implemented on a computer as a concrete means in which hardware and software work in cooperation with each other by storing a recognition dictionary creation program according to the scope of the present invention in the computer, and causing a CPU to execute the recognition dictionary creation program. In addition, a storage area which the recognition dictionary storage unit 105 and the voice recognition unit 106 use is constructed in a storage unit mounted in the above-mentioned computer, e.g. a hard disk drive unit, an external storage medium, or the like.

Next, an operation of the recognition dictionary creation device will be explained.

Figure 2:
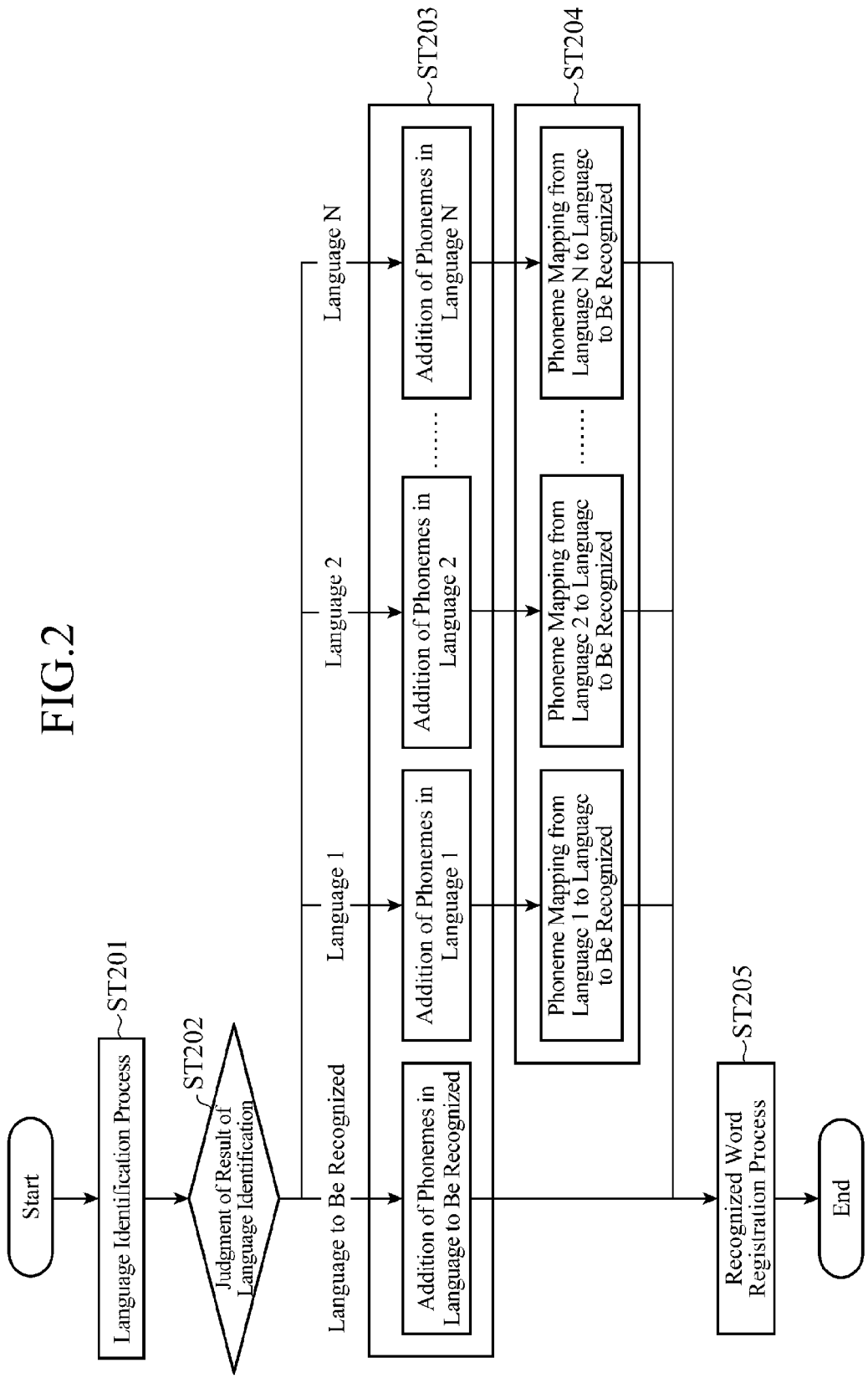
FIG. 2 is a flow chart showing a flow of a creation operation of creating a recognition dictionary which is performed by the recognition dictionary creation device in accordance with Embodiment 1.

FIG. 2 is a flow chart showing a flow of a creation operation of creating a recognition dictionary which is performed by the recognition dictionary creation device in accordance with Embodiment 1. The details of operations on one target text to be registered which are respectively performed by the language identification unit 101, the reading addition unit 102, the reading conversion unit 103, and the recognition dictionary creation unit 104 will be described.

First, the language identification unit 101 starts performing a language identification process on the character string of a target text to be registered to determine in which language this character string is described (step ST201). More specifically, the language identification unit 101 determines in which one of a plurality of languages set thereto the character string of the inputted target text to be registered is described.

For example, in a case in which the following six European languages: English, German, French, Italian, Spanish, and Dutch are set, as targets for language identification, to the language identification unit 101, when the character string of the inputted target text to be registered is "Guten Morgen", the language identification unit 101 outputs the result of the language identification showing that the language of the character string is German.

When having failed the identification of the language of the character string of the inputted target text to be registered, for example, and hence being unable to identify the language, the language identification unit 101 outputs a language which the voice recognition unit 106 can accept as a target for voice recognition as the result of the identification.

Further, a character N-gram is used for the language identification by the language identification unit 101, for example. An N-gram is an analytical model concerning language information which was established by Claude Elwood Shannon, and is used for a language model for voice recognition, a full text search, and so on. These typical methods of using an N-gram are described in the following reference 1.

(Reference 1) "A Mathematical Theory of Communication", C. E. SHANNON, The Bell System Technical Journal, Vol. 27, pp. 379-423 and 623-656, July, October, 1948.

By thus applying the concepts underlying an N-gram to the language identification of a text string, the language of the text string can be identified with a high degree of precision. The language identification for which N is set to, for example, 3 and trigrams of characters are used will explained.

The language identification unit 101 has text strings for learning each of which is described in one of languages which are targets for language identification, and determines the probability of occurrence of each sequence of three characters which appear in each of the character strings for learning. For example, in the case of a character string "MITSUBISHI", this character string can be decomposed into the following sequences: "\$\$M", "\$MI", "MIT", "ITS", "TSU", "SUB", "UBI", "BIS", "ISH", "SHI", "HI\$", and "I\$\$". "\$" means a character showing the initial of the word or the ending of the word.

After determining the frequency at which each sequence appears in all the character strings for learning described in each language i (i=1, 2, . . . , N), the language identification unit 101 uses the n top-ranked chains having higher probabilities of occurrence in all the character strings for learning described in each language as a model for the learned language, and stores the sequences of characters and the frequency of occurrence of each of the sequences in the language identification model for each language. For example, the character sequence (trigram) "\$\$M", and the probability of occurrence Pi (\$, \$, M) of the character sequence, and so on are stored for the language identification model for the language i.

The language identification unit 101 determines the sequence probability of the character sequences (trigram) of the character string of each target text to be registered for each language by using the language identification model for the language, and adopts a language which provides the highest sequence probability as the result of the language identification. For example, the sequence probability $P_i$ of "Best" for the language i is determined as $P_i = P_i(\$, \$, B) \times P_i(\$, B, E) \times P_i(B, E, S) \times P_i(E, S, T) \times P_i(S, T, \$) \times P_i(T, \$, \$)$. The language i which maximizes this sequence probability $P_i$ is the result of the language identification.

When no N-gram is stored in the language identification model, the language identification unit 101 calculates the sequence probability by providing a fixed probability which is predetermined for each character sequence as its probability of occurrence.

As for each of characters which can be described in common in a plurality of languages which are targets for language identification, and which do not contribute to language identification (e.g. numerals and symbols, such as a bracket and a period), an N-gram can be determined by replacing each of those characters with a character showing a special character. For example, a special character, such as # or @, is used.

Further, when a character which is used for a limited number of languages is used in the language identification, the language having the highest likelihood, among the languages in which such characters are used, can be outputted as the result of the identification. As characters which are used for a limited number of languages, for example, umlaut characters are listed.

By learning a text string used for learning of an N-gram (a text string used for the language identification model) by using words subjected to the same task as that to which a word to be recognized is subjected, the recognition dictionary creation device can improve the accuracy of the identification of the language. A task means a process using a word to be recognized, such as a search for a musical piece or an address recognition process. The language identification unit 101 has character strings for learning for each task. When carrying out a task which uses a target text to be registered, the language identification unit uses the character strings for learning corresponding to the task for the language identification.

Next, when receiving the result of the identification from the language identification unit 101, the reading addition unit 102 judges which one of the plurality of languages set to the voice recognition device 100 matches the result of the identification (step ST202), and adds a reading with phonemes in the language which is indicated by the judgment result to the character string of the inputted target text to be registered (step ST203). When the language which is indicated by the judgment result is the language to be recognized which is the current target for voice recognition by the voice recognition unit 106, a reading with phonemes in this language to be recognized is added to the character string of the inputted target text to be registered. Even when the language which is indicated by the judgment result is either one of the languages 1, 2, ..., and N other than the language to be recognized, a reading with phonemes in the language is similarly added to the character string of the inputted target text to be registered, as shown in FIG. 2.

The addition of the phonemes is performed by using G2P (Grapheme to Phoneme), for example. Further, this reading addition process is carried out together with a process depending upon the language, such as determination of an abbreviation or a process performed on a symbol.

The reading conversion unit 103, in step ST203, converts the target text to be registered to which the reading with the phonemes in either one of the languages other than the language to be recognized is added from the reading to a reading with phonemes in the language to be recognized (step ST204).

The reason why the reading conversion unit carries out the conversion on the phonemic system in this way is that the phonemic system acceptable by the voice recognition unit 106 is only the language to be recognized which is the target for voice recognition, and a phonemic system based on a different language includes phonemes which cannot be accepted by the voice recognition unit 106.

In an example of a converting method used for such conversion of phonemes (reading), as for a phoneme or a phoneme sequence in each language which cannot be accepted by the voice recognition unit 106, a phoneme or a phoneme sequence in the language to be recognized which is the closest to the above-mentioned phoneme or phoneme sequence is prepared in advance as a correspondence list, and the reading conversion unit 103 converts the reading of the text string acquired in step ST203 into a reading in either one of the languages other than the language to be recognized according to the above-mentioned correspondence list (a phoneme mapping).

Figure 3:
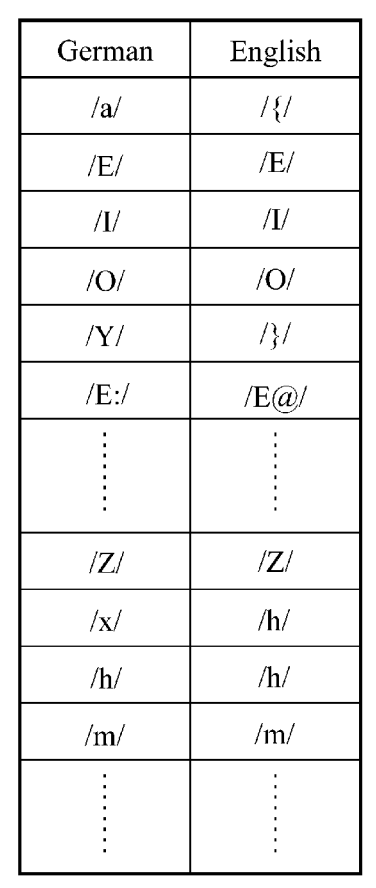

FIG. 3 is a view showing an example of the correspondence list as mentioned above, and shows a correspondence between German and English. Pronunciations including /a/ (an open front unrounded vowel) and /Y/ (a near-close near-front rounded vowel) in German do not exist in the British English pronunciation system. Therefore, when accepting phonemes in British English, the voice recognition unit 106 does not deal with such a reading.

To solve this problem, the German pronunciations /a/ and /Y/ are brought into correspondence with phonemes having pronunciations which are the closest to the German pronunciations, respectively, among the phonemes existing in British English which can be accepted by the voice recognition unit 106, e.g. /{/ (a near-open front unrounded vowel) and /}/(a close-mid front rounded vowel), as shown in the correspondence list shown in FIG. 3. X-SAMPA representation is used as the phonetic representation in this case.

This correspondence list can be created by bringing phonemes in a language into correspondence with those in another language which is close to the language linguistically. As an alternative, a correspondence between languages can be determined according to with which phonetic representation pronunciations in each language can be easily recognized, for example.

The recognition dictionary creation unit 104 receives the phonemes which are, in step ST203, added to the character string of the target text to be registered by the reading addition unit 102 or the phonemes to which the phonemes added in step ST203 are, in step ST204, converted by the reading conversion unit 103, and creates a recognition dictionary in a format which the voice recognition unit 106 can refer to (step ST205). For example, in addition of conversion of the word to be recognized into binary data, the recognition dictionary creation unit performs a morphological analysis and word division on the word to be recognized as needed and also performs creation of constraints on the language, etc. to acquire a recognition dictionary.

When there are two or more words each of which is a target text to be registered, the recognition dictionary creation unit repeatedly carries out the processing including up to the above-mentioned process on each of the target texts to be registered. The recognition dictionary creation unit can create a recognition dictionary by collectively registering all the words which are the target texts to be registered after adding a reading to each of all the words, instead of additionally registering each of all the words into the recognition dictionary.

The recognition dictionary created by the recognition dictionary creation unit 104 is stored in the recognition dictionary storage unit 105.

The voice recognition unit 106 performs voice recognition on a voice inputted thereto by making reference to recognized words and grammar described in a recognition dictionary stored in the recognition dictionary storage unit 105, and outputs the result of the recognition. For example, the voice recognition unit 106 reads a recognition dictionary described by the phonemes in the phonemic system of a specific language, and performs voice recognition on the inputted voice in a specific language. As an algorithm for voice recognition, for example, an HMM (Hidden Markov Model), a DP (Dynamic Programming) matching, or the like is used.

Although the operation in the case in which only one language is identified by the language identification unit 101 is explained until now, an operation in a case in which a plurality of languages are identified from the character string of the inputted target text to be registered by the language identification unit 101 will be explained hereafter.

Figure 4:
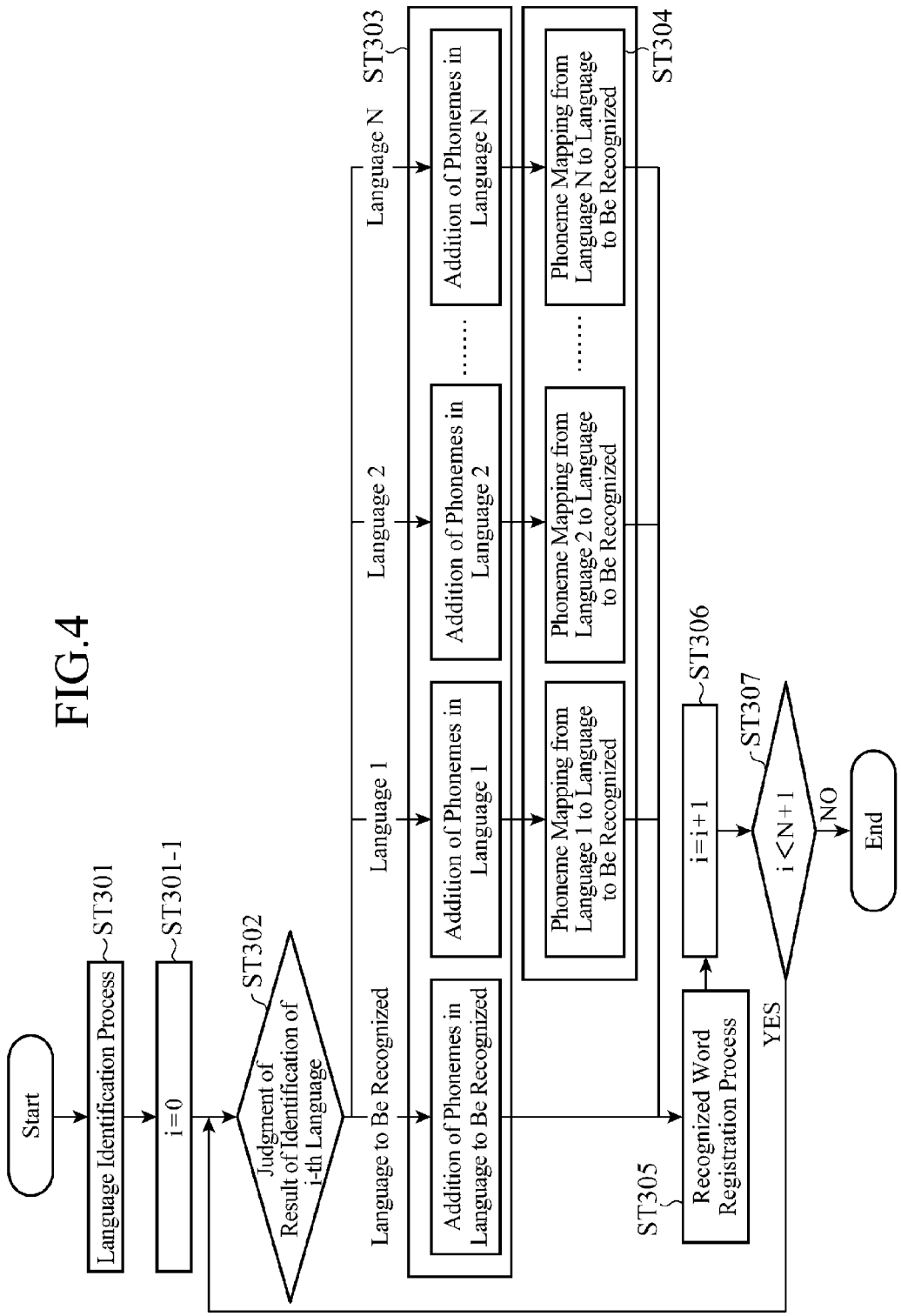
FIG. 4 is a flow chart showing a flow of a creation operation of creating a recognition dictionary which is performed by the recognition dictionary creation device in accordance with Embodiment 1.

FIG. 4 is a flow chart showing a flow of a creation operation of creating recognition dictionaries which is performed by the recognition dictionary creation device in accordance with Embodiment 1, and shows a case in which N languages are identified by the language identification unit 101.

The language identification unit 101 starts performing the language identification process on the character string of the target text to be registered, and determines in which language the character string is described to provide the N top-ranked languages having a higher likelihood that the character string is described in the language as the results of the language identification (step ST301).

In this case, although N can be a fixed value, the language identification unit 101 can alternatively output a score showing a confidence level for each language, and N can be the number of candidates each of which has a score showing a confidence level equal to or higher than a predetermined threshold or the number of candidates each of which has a score showing a confidence level falling within a fixed confidence level difference from the highest confidence level.

For example, in a case in which "Hamburg" is inputted as a target text to be registered, the language identification unit 101 outputs the result of the language identification showing that the languages identified from this text are German and English (N=2). Further, when having failed the identification of the language of the character string of the inputted target text to be registered or when the scores showing the confidence levels of all languages are lower than the threshold, the language identification unit 101 outputs the language (language to be recognized) acceptable by the voice recognition unit 106 as the result of the language identification.

Next, the language identification unit 101 initializes a counter i showing the number of languages which the language identification unit has acquired as the result of the identification, i.e. the number of times that the language identification unit carries out a below-mentioned process on all the languages to i=0 (step ST301-1), and sets the language corresponding to the i-th result of the identification to the reading addition unit 102. As a result, the reading addition unit 102, the reading conversion unit 103, and the recognition dictionary creation unit 104 perform processes of steps ST302 to ST306 with the language corresponding to the i-th (i=0 to N) result of the identification. The process of step ST302 is the same as that of step ST202 shown in FIG. 2, the process of step ST303 is the same as that of step ST203 shown in FIG. 2, the process of step ST304 is the same as that of step ST204 shown in FIG. 2, and the process of step ST305 is the same as that of step ST205 shown in FIG. 2.

The language identification unit 101, in step ST306, increments the counter i by 1, and repeats the above-mentioned series of processes with the language which is the next result of the identification. When the language identification unit 101, in step ST307, determines that the above-mentioned series of processes on all the languages which are all the results of the identification are completed (i≥N+1) according to the counted value of the counter i, the language identification unit ends the registration process on the inputted target text to be registered. As a result, even if one target text to be registered is described in a plurality of languages, the recognition dictionary creation device can register the target text to be registered in recognition dictionaries as a recognized word by identifying these languages, adding a reading with phonemes in each of the languages to the target text to be registered, and, after that, converting the reading into a reading with phonemes in the language to be recognized. Therefore, even if the user utters a text string in either one of languages which the language identification unit 101 has identified, the voice recognition device can carry out voice recognition using corresponding recognized words which are registered in a recognition dictionary.

When there are two or more target texts to be registered, the recognition dictionary creation device repeatedly performs the above-mentioned processes on each of the target texts to be registered, like in the case in which only one language is identified as the result of the identification.

The recognition dictionary creation device can create a recognition dictionary by collectively registering readings of each target text to be registered in all languages which are identified for the target text, instead of additionally registering each of the readings of each target text to be registered in all the languages which are provided as the result of the language identification for the target text in the recognition dictionary. As an alternative, the recognition dictionary creation device can add a reading to the word of each of all the target texts to be registered, and, after that, collectively register the readings of all the target texts to be registered in the recognition dictionary.

As mentioned above, the recognition dictionary creation device in accordance with this Embodiment 1 identifies the language of a reading of a target text to be registered inputted thereto and adds a reading with phonemes in the identified language to the target text to be registered, and also converts the reading of the target text to be registered from the reading in the identified language to a reading in a language to be recognized which is handled in voice recognition to create a recognition dictionary in which the reading in the language to be recognized is registered.

By doing in this way, even when in which language the target text to be registered is described is unknown (e.g. when the target text to be registered is bibliographic data, such as the title or the artist name of a musical piece registered in a portable music player, or the name of a place, the name of a person or the like which is registered in a mobile phone), the recognition dictionary creation device can register the target text to be registered as a recognized word which is referred to in the voice recognition by identifying the language of the target text to be registered with a language identification model using an N-gram, adding phonemes in the identified language to the target text to be registered, and converting the phonemes into phonemes in a language acceptable in the voice recognition.

Further, in the recognition dictionary creation device in accordance with this Embodiment 1, the language identification unit 101 identifies a plurality of languages from the target text to be registered, and, when the target text to be registered can be described in each of a plurality of languages, adds a reading in each of the languages to the target text to be registered to register the reading as a recognized word. By doing in this way, the voice recognition device can carry out voice recognition even if the user utters the text in either one of the languages.

In addition, in the recognition dictionary creation device in accordance with this Embodiment 1, as for the results of the language identification, the language identification unit 101 sets a score showing a confidence level for each language, compares this score with a predetermined threshold concerning this score, and outputs the language having the highest confidence level as the final result of the identification. By doing in this way, the voice recognition device can adopt only a pronunciation in a language having a high possibility of being uttered by the user, and can improve its voice recognition performance.

In addition, because the recognition dictionary creation device in accordance with this Embodiment 1 performs the language identification by using an N-gram, the recognition dictionary creation device can provide a stable language identification ability as compared with a case in where a word dictionary or the like is prepared for each language and language identification is performed. Further, the recognition dictionary creation device can simultaneously reduce the dictionary size, thereby being able to reduce the amount of arithmetic operation and the memory consumption.

In addition, when performing the language identification using an N-gram, the recognition dictionary creation device in accordance with this Embodiment 1 uses an N-gram in which each of characters which do not contribute to the language identification (e.g. numerals and symbols, such as a bracket and a period) are replaced by a character showing a special character. As a result, because the recognition dictionary creation device can reduce the size of the storage area for storing the language identification model and can reduce the search time and memory consumption of the language identification model, the application of the present invention to a device, such as a built-in type device, which has restrictions in its computing speed and memory size is facilitated.

In addition, when a character which is used for a limited number of languages, such as an umlaut character, exists in the target text to be registered, the recognition dictionary creation device in accordance with this Embodiment 1 identifies a language from among languages in which the characters are used, thereby being able to improve the accuracy of the language identification.

In addition, when performing the language identification using an N-gram, the recognition dictionary creation device in accordance with this Embodiment 1 creates a language identification model by using words subjected to the same task as that to which a word to be recognized is subjected (a process for which the word to be recognized is used), thereby being able to improve the accuracy of the language identification. Embodiment 2.

Figure 5:
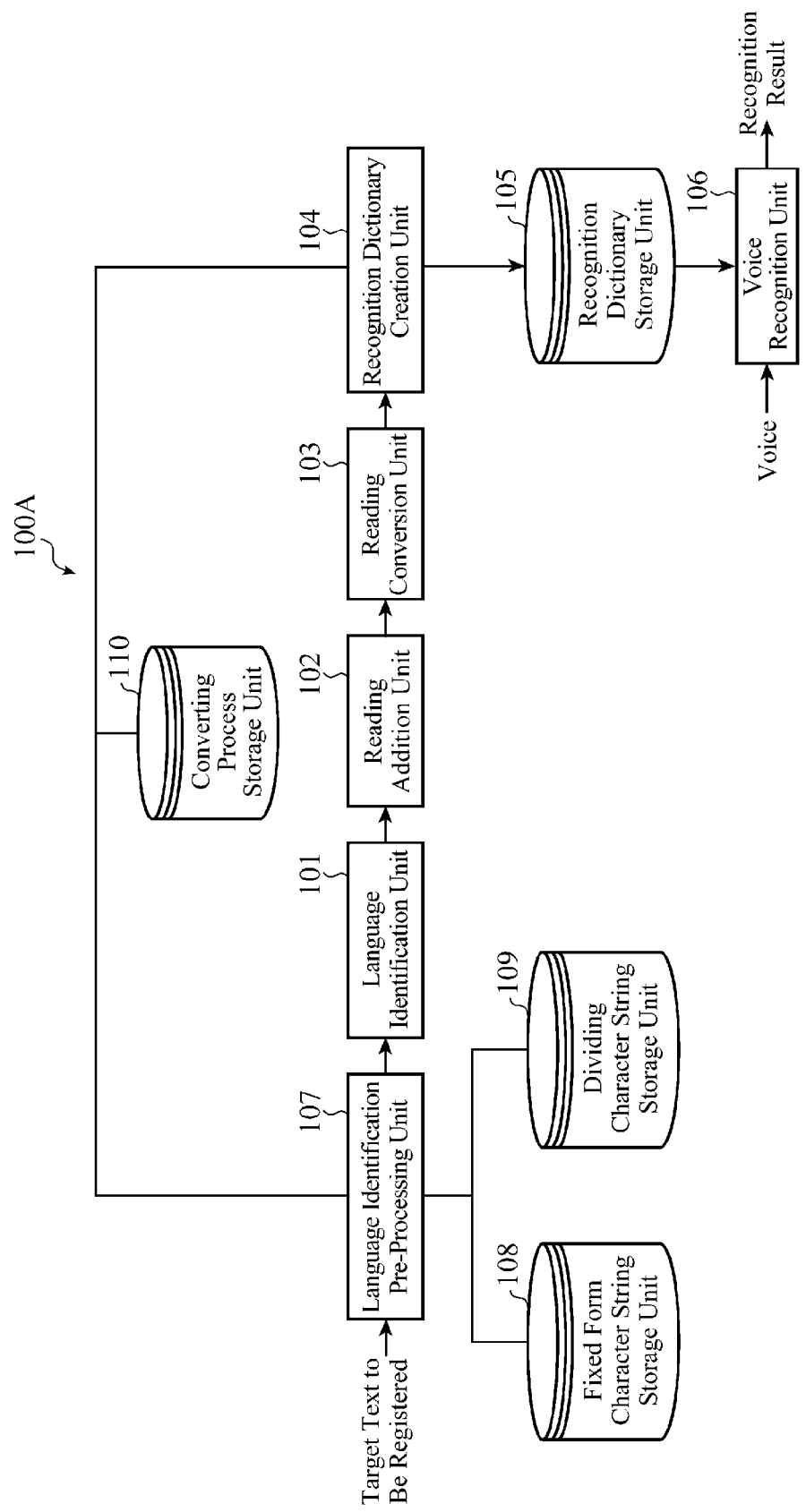
FIG. 5 is a block diagram showing the structure of a registration type voice recognition device which uses a recognition dictionary creation device in accordance with Embodiment 2 of the present invention.

FIG. 5 is a block diagram showing the structure of a registration type voice recognition device which uses a recognition dictionary creation device in accordance with Embodiment 2 of the present invention. Referring to FIG. 5, the voice recognition device 100A in accordance with Embodiment 2 is provided with a language identification pre-processing unit 107, a fixed form character string storage unit (object-to-be-excluded storage unit) 108, a dividing character string storage unit (dividing object storage unit) 109, and a converting process storage unit (process descriptions storage unit) 110, in addition to the structure of the voice recognition device in accordance with above-mentioned Embodiment 1.

The language identification pre-processing unit 107 is a component located before a language identification unit 101, for receiving a target text to be registered, and, as pre-processing which is carried out prior to language identification processing, excludes a specific character or character string (referred to as a fixed form character or a fixed form character string) in the character string of the inputted target text to be registered from the target for language identification, and divides the target text to be registered into divisions with reference to a predetermined character or character string (referred to as a dividing character or a dividing character string from here on).

The fixed form character string storage unit 108 is a storage unit for storing fixed form characters or fixed form character strings each of which is excluded from the target for language identification, and a description language in which each of the fixed form characters or the fixed form character strings is described and a reading of each of them. The dividing character string storage unit 109 is a storage unit for storing dividing characters or dividing character strings each of which serves as a dividing position at the time of dividing the target text to be registered, and a description language in which each of the dividing characters or dividing character strings is described and a reading of them. The converting process storage unit 110 is a storage unit for storing the descriptions of the pre-processing (exclusion of a character string and division of a character string) which has been performed on the target text to be registered by the language identification pre-processing unit 107.

In FIG. 5, the same components as those shown in FIG. 1 and components which operate in the same way that those shown in FIG. 1 operate are designated by the same reference numerals, and the explanation of the components will be omitted hereafter. The language identification unit 101 performs a language identification process on the character string of the target text to be registered on which the pre-processing has been performed by the language identification pre-processing unit 107. Further, when creating a recognition dictionary, a recognition dictionary creation unit 104 creates a recognition dictionary which is adapted to the character string of the target text to be registered by using the descriptions of the pre-processing stored in the converting process storage unit 110, i.e. a connection relation between divisions into which the target text to be registered is divided, each character string excluded from the target text to be registered, and the reading of the character string.

Further, the language identification pre-processing unit 107, the fixed form character string storage unit 108, the dividing character string storage unit 109, and the converting process storage unit 110 can be implemented on a computer as a concrete means in which hardware and software work in cooperation with each other by storing a recognition dictionary creation program according to the scope of the present invention in the computer, and causing a CPU to execute the recognition dictionary creation program. In addition, a storage area which the fixed form character string storage unit 108, the dividing character string storage unit 109, and the converting process storage unit 110 use is constructed in a storage unit mounted in the above-mentioned computer, e.g. a hard disk drive unit, an external storage medium, or the like.

Next, an operation of the recognition dictionary creation device will be explained.

Figure 6:
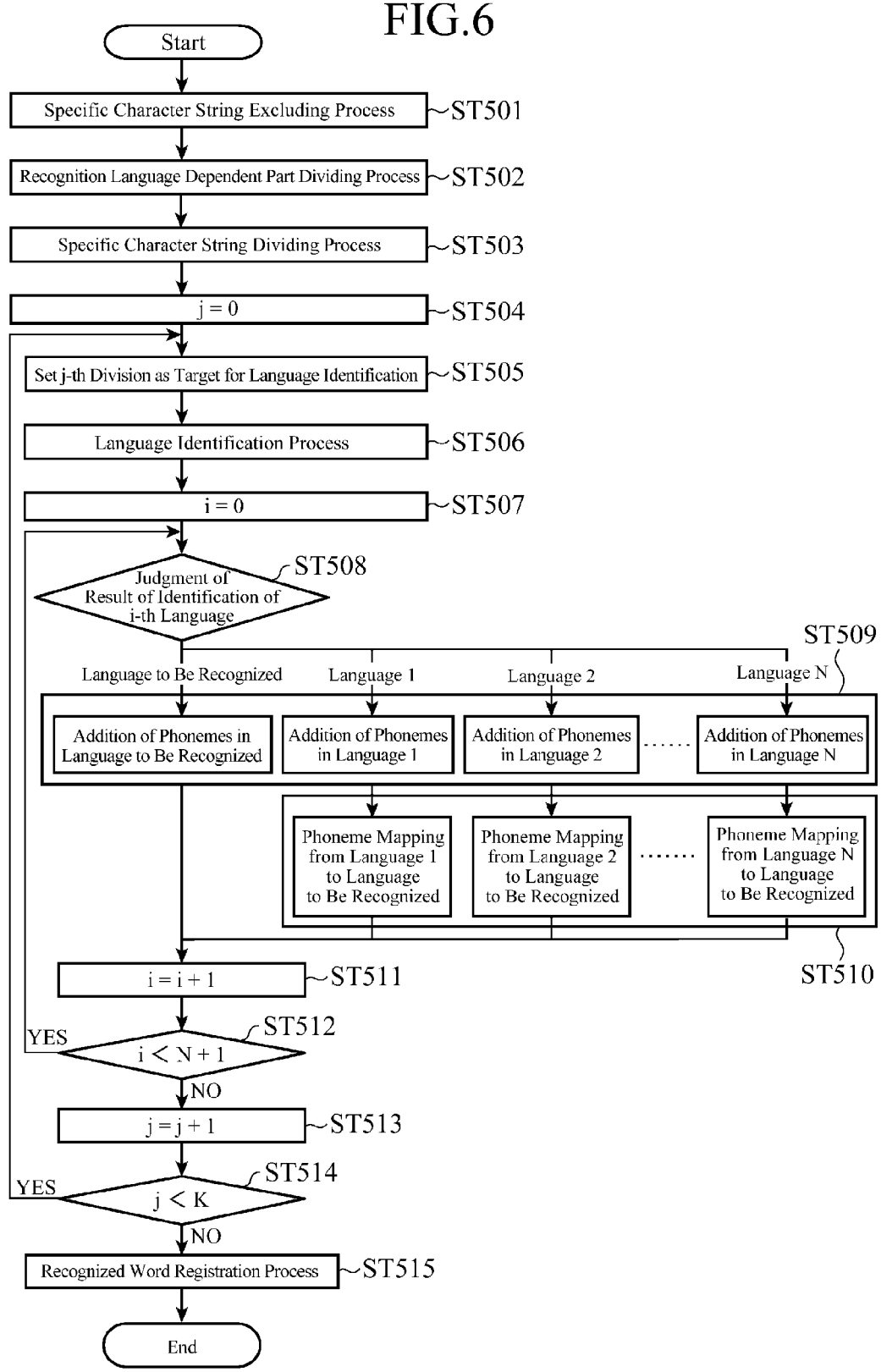
FIG. 6 is a flow chart showing a flow of a creation operation of creating a recognition dictionary which is performed by the recognition dictionary creation device in accordance with Embodiment 1.

FIG. 6 is a flow chart showing a flow of a creation operation of creating a recognition dictionary which is performed by the recognition dictionary creation device in accordance with Embodiment 2. The details of operations performed by the language identification pre-processing unit 107, the language identification unit 101, a reading addition unit 102, a reading conversion unit 103, and the recognition dictionary creation unit 104 will be mentioned.

First, when receiving a target text to be registered, the language identification pre-processing unit 107 detects a fixed form character or a fixed form character string included in the character string of the target text to be registered by making reference to the memory contents of the fixed form character string storage unit 108, and excludes the fixed form character or the fixed form character string from the target for language identification (step ST501). As an example of the fixed form character or the fixed form character string, a description in a specific language which appears in common in a plurality of languages is provided.

In a system which handles bibliographic data about musical pieces, "Disc", "Best of", etc. can be described in common (described in English) in texts written in a plurality of languages independently upon a specific language. Therefore, such characters or character strings, and their description languages (in the above-mentioned example, English) are stored in the fixed form character string storage unit 108. For example, when a target text to be registered which is "Best Of Ce n'est que moi" is inputted, because "Best Of" is determined as to be English words from the memory contents of the fixed form character string storage unit 108 and its reading is acquired from the fixed form character string storage unit, "Best Of" is excluded from the target for language identification by the language identification pre-processing unit 107 and "Ce n'est que moi" remains as a character string for language identification.

The language identification pre-processing unit 107 then detects a dividing character or a dividing character string included in the character string of the target text to be registered by making reference to the memory contents of the dividing character string storage unit 109, and divides the character string of the target text to be registered into divisions with reference to the dividing character or the dividing character string (step ST502). As a dividing character or a dividing character string, "(", ")", "-", or the like which is a character which divides the descriptions of the target text to be registered into divisions can be provided.

For example, when a target text to be registered which is "Je vivrai sans toi (I Will Say Goodbye)" is inputted, the language identification pre-processing unit 107 detects round brackets "("and")" included in the character string of the target text to be registered by making reference to the memory contents of the dividing character string storage unit 109, and divides the character string of the target text to be registered into divisions with reference to these characters. As a result, the target text to be registered is divided into the following two character strings: "Je vivrai sans toi" and "I Will Say Goodbye".

Next, the language identification pre-processing unit 107 refers to the memory contents of the dividing character string storage unit 109 to specify a character string, such as an uppercase character string (spelling) or a numeral, which is included in the character string of the target text to be registered and which can be read in the language to be recognized regardless of the description language, and excludes this character string from the target text to be registered and divides the target text to be registered from which the character string is excluded into divisions (step ST503). Because no language is specified as the result of the language identification for this character string part, and the language to be recognized is specified for this character string part, a reading in the language to be recognized is added to the character string part.

The recognition dictionary creation device can add a reading in the language to be recognized to this character string part (a character string of uppercase characters (spelling) or a numeral) in advance, and pre-store the reading in the dividing character string storage unit 109, and the reading addition unit 102 can add a reading in the language which the language identification unit 101 has identified to each of character string divisions into which the target text to be registered is divided with the above-mentioned character string part being defined as a boundary between them.

By thus adding two types of readings in the language to be recognized and in the language which is the result of the identification to each character string part, such as a character string of uppercase characters (spelling) or a numeral, the recognition dictionary creation device can correctly add a reading to each character string part which is uttered in the language to be recognized independently upon the language (the language which is the result of the identification) in which parts in the target text to be registered other than a character string part as mentioned above, such as a character string of uppercase characters or a numeral, are described.

The language identification pre-processing unit 107 stores the descriptions of the pre-processing of steps ST501 to ST503 in the converting process storage unit 110. As the descriptions of the pre-processing, a fixed form character or a fixed form character string which is excluded from the target text to be registered, the description language in which the fixed form character or the fixed form character string is described, and a reading with phonemes in this language, a dividing character or a dividing character string which is a dividing position of the target text to be registered, a connection relation between divisions into which the target text to be registered is divided, and so on are stored in the converting process storage unit 110.

After that, the language identification pre-processing unit 107 initializes a counter j for counting the number of divisions K with which the language identification pre-processing unit divides the target text to be registered (j=0) (step ST504). The language identification pre-processing unit 107 then sets up a j-th division as the character string which is the target for language identification, and outputs this j-th division to the language identification unit 101 (step ST505).

The language identification unit 101 starts performing a language identification process on the character string which is the j-th division inputted thereto from the language identification pre-processing unit 107 according to the same procedure as that shown in above-mentioned Embodiment 1, and determines in which language the character string is described to provide the N top-ranked languages having a higher likelihood that the above-mentioned character string is described in the language (i.e. the N top-ranked languages having a higher likelihood) as the results of the language identification (step ST506).

Next, the language identification unit 101 initializes a counter i showing the number of languages which the language identification unit has acquired as the results of the identification, i.e. the number of times that the language identification unit carries out a below-mentioned process for all the languages to i=0 (step ST507), and sets the language corresponding to the i-th result of the identification to the reading addition unit 102.

In this way, the reading addition unit 102 and the reading conversion unit 103 perform processes of steps ST508 to ST510 with the language corresponding to the i-th (i=0 to N) result of the identification. The process of step ST508 is the same as that of step ST202 shown in FIG. 2, the process of step ST509 is the same as that of step ST203 shown in FIG. 2, and the process of step ST510 is the same as that of step ST204 shown in FIG. 2.

The language identification unit 101, in step ST511, increments the counter i by 1, and repeats the above-mentioned series of processes with the language which is the next result of the identification. When the language identification unit, in step ST512, determines that the above-mentioned series of processes on all the languages which are all the results of the identification are completed (i≥N+1), the language identification unit increments a counter j by 1 (step ST513). Until the language identification unit 101, in step ST514, determines that the processes on the character string of each of all the divisions into which the target to be recognized is divided have been completed (j≥K) according to the counted value of the counter j, the language identification unit repeatedly performs the series of processes of steps ST505 to ST514 on the character string of each of all the divisions into which the target to be recognized is divided.

The recognition dictionary creation unit 104 specifies a reading of each character string excluded from the character string of the target text to be registered by making reference to the descriptions of the pre-processing stored in the converting process storage unit 110, and combines the reading of each character string excluded from the target for language identification and the readings added to the character strings of all the divisions into which the target to be recognized is divided, which are inputted from the reading conversion unit 103, to create a recognition dictionary in a form which the voice recognition unit 106 can refer to (step ST515). For example, in addition of conversion of the word to be recognized into binary data, the recognition dictionary creation unit performs a morphological analysis and a word division on the word to be recognized as needed and also performs creation of constraints on the language, etc. to acquire a recognition dictionary.

As mentioned above, the recognition dictionary creation device in accordance with this Embodiment 2 is provided with the fixed form character string storage unit 108, the dividing character string storage unit 109, the language identification pre-processing unit 107 which performs pre-processing on the target text to be registered according to the descriptions stored in these storage units 108 and 109, and the converting process storage unit 110 for storing the descriptions of the pre-processing performed by the language identification pre-processing unit 107, and the recognition dictionary creation unit 104 determines phonemes showing a reading of the target text to be registered on which the pre-processing has been performed by the language identification pre-processing unit 107 according to the memory contents of the converting process storage unit 110 to create a recognition dictionary in which the reading is registered.

By dividing the text inputted thereto into divisions by using a specific character string, and performing the language identification process and the reading addition process on each of the divisions into which the text is divided in this way, even in a case in which words described in a plurality of languages are included in the target text to be registered, the recognition dictionary creation device can correctly identify the language of each of the divisions into which the target text to be registered is divided.

Further, by storing, as specific character strings, words and phrases each of which can be included and used in texts in a plurality of languages and each of which is described in a specific language, and excluding a specific character string from the target for language identification, even in a case in which a phrase (e.g. "Disc 1", "Best of" or the like in a musical album title) which is used regardless of languages is included in the target text to be registered, the recognition dictionary creation device can correctly identify the language of a reading of each of character string divisions other than the phrase by identifying the language of each of the character string divisions other than the phrase.

Further, by dividing a portion having a reading depending on the language to be recognized, the recognition dictionary creation device can correctly add a reading also to the portion.

INDUSTRIAL APPLICABILITY

Because the recognition dictionary creation device in accordance with the present invention can create a recognition dictionary in a phonemic system of voice recognition from a word whose description language is unknown, the recognition dictionary creation device in accordance with the present invention is suitable for use in voice recognition devices, such as a portable music player, a mobile phone, and a vehicle-mounted navigation system, each of which handles data in which words described in a plurality of languages coexist.

The invention claimed is:

1. A recognition dictionary creation device comprising:
    a language identification unit for identifying a language of a reading of an inputted text which is a target to be registered;
    a reading addition unit for adding a reading with phonemes in the language identified by said language identification unit to said target text to be registered;
    a reading conversion unit for converting said reading of said target text to be registered from the phonemes in the language identified by said language identification unit to phonemes in a language to be recognized which is handled in voice recognition; and
    a recognition dictionary creation unit for creating a recognition dictionary in which said reading of said target text to be registered which is converted by said reading conversion unit is registered.

2. The recognition dictionary creation device according to claim 1, wherein said language identification unit outputs a predetermined number of languages each having a score showing a higher likelihood that the reading of said target text to be registered is described in the language, among a plurality of languages which are targets for language identification, as results of the identification, said reading addition unit adds a reading with phonemes in each of said predetermined number of languages identified by said language identification unit to said target text to be registered, and said reading conversion unit converts the reading of said target text to be registered from the phonemes in each of said predetermined number of languages identified by said language identification unit to phonemes in the language to be recognized.

3. The recognition dictionary creation device according to claim 2, wherein said language identification unit outputs said language to be recognized as a result of the identification when said score is smaller than a predetermined threshold.

4. The recognition dictionary creation device according to claim 1, wherein said recognition dictionary creation device includes an object-to-be-excluded storage unit for storing a character or a character string which is to be excluded from a target for language identification, a language identification pre-processing unit for excluding a portion corresponding to said character or said character string which is to be excluded from said target for language identification and which is stored in said object-to-be-excluded storage unit from said target text to be registered, and a process descriptions storage unit for storing descriptions of the excluding process of excluding said character or said character string which is to be excluded from said target for language identification which is performed on said target text to be registered by said language identification pre-processing unit, and wherein said language identification unit identifies the language of the reading of said target text to be registered from which said character or said character string which is to be excluded from said target for language identification is excluded by said language identification pre-processing unit, and said recognition dictionary creation unit refers to the descriptions of the excluding process stored in said process descriptions storage unit to determine the reading of said target text to be registered from a reading of said character or said character string which is to be excluded from said target for language identification, and a reading of said target text to be registered from which said character or said character string which is to be excluded from said target for language identification is excluded.

5. The recognition dictionary creation device according to claim 4, wherein said recognition dictionary creation device includes a dividing object storage unit for storing a dividing character or a dividing character string, said language identification pre-processing unit divides a character string of said target text to be registered into divisions by using said dividing character or said dividing character string stored in said dividing object storage unit, descriptions of the dividing process which is performed on said target text to be registered by said language identification pre-processing unit are stored in said process descriptions storage unit, said language identification unit identifies a language of a reading of each of the divisions into which said target text to be registered is divided by said language identification pre-processing unit, and said recognition dictionary creation unit refers to the descriptions of the dividing process stored in said process descriptions storage unit to determine the reading of said target text to be registered from the reading of each of said divisions and create a recognition dictionary in which this reading of said target text to be registered is registered.

6. The recognition dictionary creation device according to claim 5, wherein said dividing object storage unit stores a dividing character or a dividing character string including a numeral or an uppercase character string, and a reading of the dividing character or the dividing character string in the language to be recognized, said language identification pre-processing unit excludes the dividing character or the dividing character string including said numeral or said uppercase character string from said target text to be registered, and divides the character string of said target text to be registered into divisions, said language identification unit identifies the language of the reading of each of the divisions into which said target text to be registered is divided by said language identification pre-processing unit, said reading addition unit adds a reading in a language of said divisions which is identified by said language identification unit to the dividing character or the dividing character string including said numeral or said uppercase character string, and said recognition dictionary creation unit refers to the descriptions of the excluding process stored in said process descriptions storage unit to determine the reading of said target text to be registered from the reading of each of said divisions, a reading in the language to be recognized of said dividing character or said dividing character string, and a reading of each of said divisions, into which said target text to be registered is divided, in said language to be recognized into which the reading in the language of said each of said divisions is converted, and create a recognition dictionary in which said reading of said target text to be registered is registered.

7. The recognition dictionary creation device according to claim 1, wherein said language identification unit uses a language identification model including an N-gram for each language which is a target for language identification, and its probability of occurrence to calculate a sequence probability of an N-gram of said target text to be registered for each language, and identify the language of the reading from a likelihood based on said sequence probability.

8. The recognition dictionary creation device according to claim 7, wherein said language identification unit replaces each character or each character string which is included in said target text to be registered and is described in common in a plurality of languages which are targets for the language identification and which does not contribute to the language identification with a special character to create an N-gram.

9. The recognition dictionary creation device according to claim 7, wherein when a character or a character string which is used for a limited number of languages is included in said target text to be registered, said language identification unit outputs a language having a highest likelihood, among said limited number of languages, as a result of the identification.

10. The recognition dictionary creation device according to claim 7, wherein said language identification unit is provided with a language identification model for each process using a word to be recognized, and uses a language identification model corresponding to a process using said target text to be registered for the language identification.

11. A voice recognition device comprising:
a language identification unit for identifying a language of a reading of an inputted text which is a target to be registered;
a reading addition unit for adding a reading with phonemes in the language identified by said language identification unit to said target text to be registered;
a reading conversion unit for converting said reading of said target text to be registered from the phonemes in the language identified by said language identification unit to phonemes in a language to be recognized which is handled invoice recognition;
a recognition dictionary creation unit for creating a recognition dictionary in which said reading of said target text to be registered which is converted by said reading conversion unit is registered; and
a voice recognition unit for performing voice recognition on a voice inputted thereto by making reference to said recognition dictionary created by said recognition dictionary creation unit.

12. A voice recognition device comprising:
an object-to-be-excluded storage unit for storing a character or a character string which is to be excluded from a target for language identification;
a dividing object storage unit for storing a dividing character or a dividing character string;
a language identification pre-processing unit for excluding said character or said character string which is to be excluded from said target for language identification from an inputted target text to be registered and also dividing said inputted target text to be registered into divisions by using said dividing character or said dividing character string on a basis of the contents stored in said object-to-be-excluded storage unit and the contents stored in said dividing object storage unit;
a process descriptions storage unit for storing descriptions of the process which is performed on said target text to be registered by said language identification pre-processing unit;
a language identification unit for identifying a language of a reading of said target text to be registered on which said process is performed by said language identification pre-processing unit;
a reading addition unit for adding a reading with phonemes in the language identified by said language identification unit to said target text to be registered;

a reading conversion unit for converting the reading of said target text to be registered from the phonemes in the language identified by said language identification unit to phonemes in a language to be recognized which is handled in voice recognition;

a recognition dictionary creation unit for referring to the descriptions of said process stored in said process descriptions storage unit to determine a reading of said target text to be registered on which said process is performed by said language identification pre-processing unit and create a recognition dictionary in which this reading is registered; and a voice recognition unit for performing voice recognition on a voice inputted thereto by making reference to said recognition dictionary created by said recognition dictionary creation unit.

* * * * *